(12) United States Patent
Ferigo

(10) Patent No.: US 10,005,323 B2
(45) Date of Patent: Jun. 26, 2018

(54) REINFORCED BIAS- OR RADIAL-CARCASS TIRE

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventor: Hervé Ferigo, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 92 days.

(21) Appl. No.: 15/104,215

(22) PCT Filed: Dec. 3, 2014

(86) PCT No.: PCT/EP2014/076391
§ 371 (c)(1),
(2) Date: Jun. 13, 2016

(87) PCT Pub. No.: WO2015/086395
PCT Pub. Date: Jun. 18, 2015

(65) Prior Publication Data
US 2016/0311269 A1    Oct. 27, 2016

(30) Foreign Application Priority Data

Dec. 12, 2013 (FR) ...................... 13 62449

(51) Int. Cl.
*B60C 15/00* (2006.01)
*B60C 9/00* (2006.01)
(Continued)

(52) U.S. Cl.
CPC .......... *B60C 15/0036* (2013.01); *B60C 9/005* (2013.01); *B60C 9/0042* (2013.01);
(Continued)

(58) Field of Classification Search
None
See application file for complete search history.

(56) References Cited

U.S. PATENT DOCUMENTS 3,961,657 A * 6/1976 Chrobak ................ B29D 30/00
152/454
3,961,948 A   6/1976 Saeva
(Continued)

FOREIGN PATENT DOCUMENTS

| CN | 1 775 571 | 5/2006 |
| EP | 1 080 948 | 3/2001 |
| JP | H02 293207 | 12/1990 |

*Primary Examiner* — Jodi C Franklin
(74) *Attorney, Agent, or Firm* — Cozen O'Connor

(57) ABSTRACT

The invention relates to a tire having at least one carcass reinforcement comprising reinforcers, surmounted radially on the outside by a crown reinforcement, itself radially on the inside of a tread, said crown reinforcement being made up of at least one layer of reinforcement elements, said tread being connected to two beads by way of two sidewalls, said beads being intended to come into contact with a rim flange having a rim flange top C, each bead having at least one circumferential reinforcement element, said carcass reinforcement comprising an end at each bead, the end of the carcass reinforcement being turned up once in an outward radial direction of the tire and about said bead wire, so as to form a turnup, then being folded in said radially inward direction so as to form a fold forming a radially external end and three adjacent parts along an axial axis made up of a central part, of an axially internal lateral part, and of an axially external lateral part.

The tire is characterized in that the radially external end of the turnup is disposed between the rim flange top C and a point D, said points C and D being situated at the surface of the sidewall and disposed on either side of a point E situated on the sidewall corresponding to the nominal section width, (Continued)

said point D being disposed at a maximum radial length equal to 85% of the length present between the axial end S of the crown reinforcement and the rim flange top C.

12 Claims, 2 Drawing Sheets

(51) Int. Cl.
    *B60C 9/06*     (2006.01)
    *B60C 9/08*     (2006.01)
    *B60C 9/04*     (2006.01)
    *B60C 9/20*     (2006.01)
    *B60C 11/00*     (2006.01)
    *B60C 13/00*     (2006.01)
    *B60C 15/04*     (2006.01)
    *B60C 15/06*     (2006.01)
    *B60B 21/04*     (2006.01)
    *B60C 9/02*     (2006.01)

(52) U.S. Cl.
    CPC .................. *B60C 9/04* (2013.01); *B60C 9/06* (2013.01); *B60C 9/08* (2013.01); *B60C 9/20* (2013.01); *B60C 11/00* (2013.01); *B60C 13/00* (2013.01); *B60C 15/0027* (2013.01); *B60C 15/0054* (2013.01); *B60C 15/0072* (2013.01); *B60C 15/04* (2013.01); *B60B 21/04* (2013.01); *B60C 2009/0035* (2013.01); *B60C 2009/0223* (2013.01); *B60C 2009/0475* (2013.01); *B60C 2015/009* (2013.01); *B60C 2015/0621* (2013.01); *B60C 2015/0625* (2013.01)

(56) References Cited

U.S. PATENT DOCUMENTS 5,232,033 A * 8/1993 Durif .................... B60B 21/10
    152/379.3
5,837,073 A * 11/1998 Cauquot .............. B60B 21/104
    152/158
2010/0108220 A1 * 5/2010 Mruk .................... B60C 15/06
    152/458
2010/0224300 A1 * 9/2010 Maruoka ................ B60C 15/04
    152/541
2011/0308688 A1 * 12/2011 Bestgen .................... B60C 9/07
    152/552
2012/0160390 A1 * 6/2012 Grisin .................... B60C 15/06
    152/539
2012/0261046 A1 * 10/2012 Domingo ................ B60C 5/142
    152/548
2012/0267028 A1 * 10/2012 Laurent ................ B60C 15/06
    152/547
2012/0325390 A1 * 12/2012 Bourgeois .............. B60C 15/06
    152/541
2014/0008002 A1 * 1/2014 Bourgeois ........... B60C 15/0027
    152/541
2014/0190607 A1 * 7/2014 Matsunami ......... B60C 11/0302
    152/209.11
2014/0305568 A1 * 10/2014 Sallaz .................... B60C 9/0007
    152/543
2015/0007922 A1 * 1/2015 Lardjane ................ B60C 9/2009
    152/527
2015/0020945 A1 * 1/2015 Bourgeois ................ B60C 9/28
    152/541
2015/0075691 A1 * 3/2015 Merino Lopez ...... B60C 19/122
    152/502
2015/0231927 A1 * 8/2015 Montezin .................. B60C 9/02
    152/539
2015/0246582 A1 * 9/2015 Montezin .................. B60C 9/08
    152/548
2015/0375574 A1 * 12/2015 Muhlhoff .............. B60C 19/122
    152/502
2016/0001611 A1 * 1/2016 Muhlhoff .............. B60C 19/122
    152/502
2016/0167449 A1 * 6/2016 Poorters .............. B60C 15/0009
    152/541
2016/0311269 A1 * 10/2016 Ferigo ................ B60C 15/0027
2017/0291458 A1 * 10/2017 Kim .................... B60C 15/0628

* cited by examiner

REINFORCED BIAS- OR RADIAL-CARCASS TIRE

RELATED APPLICATIONS

This is a U.S. National Phase Application under 35 USC 371 of International Application PCT/EP2014/076391 filed on Dec. 3, 2014.

This application claims the priority of French application no. 1362449 filed Dec. 12, 2013, the entire content of which is hereby incorporated by reference.

FIELD OF THE INVENTION

The invention relates to cross-ply or radial tires.

BACKGROUND OF THE INVENTION

Radial tires are gradually being imposed on various markets, notably the market for passenger vehicle tires. This success is due in particular to the endurance, comfort and low rolling resistance qualities that radial tires have to offer.

The main parts of a tire are the tread, the sidewalls and the beads. The beads are intended to come into contact with the rim. In a radial tire, each of the main parts of which the tire is made, namely the tread, the sidewalls and the beads, has functions that are clearly separated from one another, and therefore has a well-known specific makeup.

A radial tire is essentially reinforced by a carcass reinforcement comprising at least one carcass ply set at an angle substantially equal to 90° with respect to the circumferential direction of the tire. This carcass reinforcement is surmounted radially on the outside, and under the tread, by reinforcing plies that form a belt.

A cross-ply tire differs from a radial tire in that there are at least two crossed plies set at angles other than 90° with respect to the circumferential direction of the tire. The plies are said to be "crossed" because the angles are of opposite sign from one ply to the next.

It will be recalled that the circumferential direction of the tire is the direction in a plane perpendicular to the rotation axis of the tire and tangential to the tire belt reinforcement.

Since the emergence of radial tires, certain cross ply tires have also been provided with a belt reinforcement under the tread.

In both these types of tire, the tread, in direct contact with the ground, notably has the function of providing contact with the roadway and needs to adapt to the shape of the ground. The sidewalls for their part absorb the unevennesses of the ground by transmitting the mechanical forces required to support the load of the vehicle and allow it to move.

The belt reinforcement is a reinforcement which, on the one hand, needs to be sufficiently rigid with regard to edge deformations so that the tire can develop the cornering thrust necessary for steering, and transmit torque for traction or for braking and, on the other hand, be very soft in bending, that is to say allow variations in curvature in its plane in order to provide a sufficient area of contact of the tire with the ground.

As a result, the belt reinforcement generally has a composite structure allowing it to offer the required rigidity for a relatively low weight. The belt reinforcement is generally made up of at least two plies set at different angles, comprising reinforcers in the form of cords, coated with elastomer composition. The reinforcer elements are crossed from one ply to the other with respect to the circumferential direction and may or may not be symmetrical with respect to this direction.

DEFINITIONS

"longitudinal direction" is the direction of running of the tire,

"radial direction" is a direction that intersects the rotation axis of the tire and is perpendicular thereto, "axial direction" is a direction parallel to the rotation axis of the tire, "radially on the inside of" means closer to the rotation axis on a straight line perpendicular to the rotation axis of the tire, "radially on the outside of" means further away from the rotation axis on a straight line perpendicular to the rotation axis of the tire, "equatorial plane or midplane" means a plane perpendicular to the rotation axis of the tire and which divides the tire into two substantially equal halves, "transverse or axial direction of the tire" means a direction parallel to the rotation axis, "radial or meridian plane" means a plane which contains the rotation axis of the tire.

Tires for heavy vehicles comprising a carcass ply provided with metal reinforcers, the final part of which at each bead is folded on itself, twice, in the radial direction towards the circumferential reinforcement element, also known as bead wire, are already known from the document JP2293207 A. According to that document, this final part is folded amid two layers of rubber.

The document EP 1,080,948A1 describes a tire comprising a carcass reinforcement turned up about a bead wire and then folded in an outward axial direction. This fold is coated with an elastomer composition comprising reinforcers.

SUMMARY OF THE INVENTION

One object of the invention is to provide a tire that has better cornering thrust, which comprises fewer raw materials, and notably fewer layers of elastomer, without impairing rolling resistance.

This and other objects are attained in accordance with one aspect of the invention directed to a tire having at least one carcass reinforcement comprising reinforcers, surmounted radially on the outside by a crown reinforcement, itself radially on the inside of a tread, said crown reinforcement being made up of at least one layer of reinforcement elements, said tread being connected to two beads by way of two sidewalls, said beads being intended to come into contact with a rim flange having a rim flange top C, each bead having at least one circumferential reinforcement element, said carcass reinforcement comprising an end at each bead, the end of the carcass reinforcement being turned up once in an outward radial direction of the tire and about said bead wire, so as to form a turnup, then being folded in said radially inward direction so as to form a fold forming a radially external end and three adjacent parts along an axial axis made up of a central part, of an axially internal lateral part, and of an axially external lateral part.

The tire is characterized in that the radially external end of the turnup is disposed between the rim flange top C and a point D, said points C and D being situated at the surface of the sidewall, and disposed on either side of a point E situated on the sidewall corresponding to the nominal section width, said point D being disposed at a maximum radial length equal to 85% of the length present between the axial end S of the crown reinforcement and the rim flange top C.

The tire according to the invention has the advantage of having a simple and rapid design.

Preferably, the decoupling elastomer composition is present between the radially external end of said turnup and a point G situated radially on the inside with respect to said end and at a distance from said radially external end by a length less than or equal to 10 mm.

Between the points C and D, the reinforcers of the carcass ply may be set at an angle of less than or equal to 85° with respect to the circumferential direction, and preferably equal to +75° or −75° with respect to the circumferential direction.

The angle between each of the (central) and (lateral) parts of the carcass ply follows the rules of the following shaping law, according to which the angle of said parts evolves with the radius of the tire:

$$\cos(\alpha_1) = t \times \cos(\alpha_0) \text{ where } t = R_1/(R_0 \times (1+e))$$

where
$\alpha_0$ is the initial angle before shaping
$\alpha_1$ is the final angle after shaping
$R_0$ is the laying radius before shaping
$R_1$ is the laying radius after shaping
e is equal to 0.03 regardless of the type of tire When applying this law, between the points C and D, and when the fold is made towards the inward direction in the axial direction, the reinforcers of the carcass ply may be set at an angle successively equal to −75°, +75°, +75° starting from the most outward direction to the most inward direction in the axial direction.

Between the points D and S, the reinforcers of the carcass ply may be set at an angle of greater than or equal to 85°, and preferably equal to 90° with respect to the circumferential direction. The point S corresponds to the axial end of the crown region.

Starting from the point S and in the direction of the axis ZZ', the reinforcers of the carcass ply may be set at an angle equal to 90° with respect to the circumferential direction.

The reinforcers of the carcass ply are preferably made of a textile material chosen from rayon, nylon, polyester, aramid or a mixture thereof.

Some of the reinforcers of the outer part of the carcass ply may be sectioned in the case of an inward turnup. Some of the reinforcers of the central part of the carcass ply may be sectioned in the case of an outward turnup. This part may have between 3 and 8% of the reinforcers of the central part.

The reinforcers are cut at the end of the butting step during the method for manufacturing the tire so as to encourage the carrying out of the butting step. The cut reinforcers are disposed in a limited and narrow region, they are not scattered but concentrated in this region.

According to an embodiment of the invention, the crown reinforcement comprises at least one ply radially on the outside of the carcass ply and radially on the inside of a tread.

According to an embodiment of the invention, no elastomer composition is present between the central part and the axially external lateral part of the turnup.

BRIEF DESCRIPTION OF THE DRAWINGS

The invention will now be described with the aid of examples and drawings which follow and which are given purely by way of illustration, and in which.

In the various figures, identical or similar technical elements have been given the same reference numbers. In order not to overburden the text, their descriptions are not repeated.

DETAILED DESCRIPTION OF THE DRAWINGS

Figure 1:
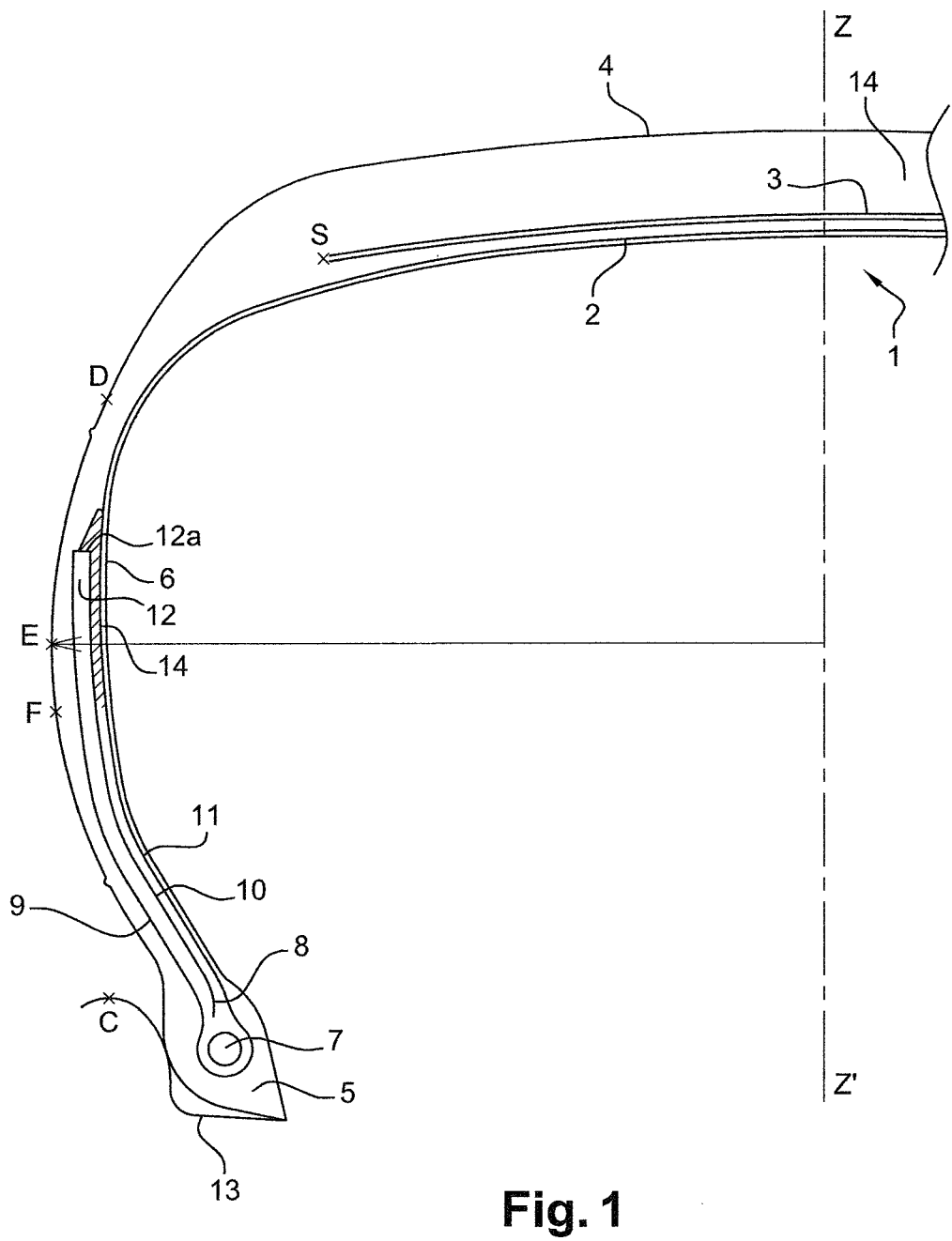
FIG. 1 schematically shows the cross section of a half tire according to the invention in a radial plane, according to a first embodiment.
Figure 2:
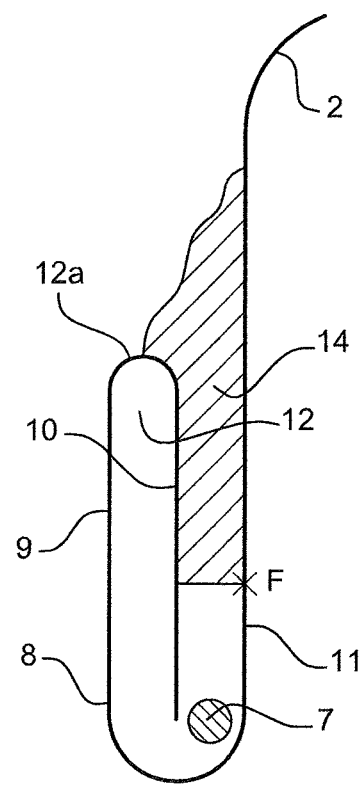
FIG. 2 schematically shows an enlarged view in cross section of the radially lower part of a turnup, of the carcass ply, situated in what is known as the bottom region of the tire, according to the same embodiment of the invention as the one shown in FIG. 1.

As FIGS. 1 and 2 show, the tire according to the invention, having the overall reference 1, comprises at least one carcass reinforcement 2 comprising reinforcers (not shown). A crown reinforcement S 3 comprising at least one layer of reinforcement elements (not shown) is surmounted radially on the inside of the carcass ply 2, followed by a tread 4 radially on the outside.

The tread 4 is connected to two beads 5 by way of two sidewalls 6. Each bead 5 comprises a circumferential reinforcement element 7, also known as a bead wire. Each bead 5 is fitted into a rim flange 13 comprising a rim flange top C The carcass ply 2 comprises, at each bead 5, a final end 8 that is folded on itself twice in the radial direction and in the inward direction with respect to the centre of the tire in the axial direction, in the direction of the circumferential reinforcement element 7. This fold makes it possible to bring said final end 8 close to the reinforcement element 7.

Thus, at the sidewalls 6, the carcass ply 2 comprises a turnup 12, and three adjacent parts made up of a central part 10, an axially outer lateral part 9 and an axially inner lateral part 11.

Note that the nominal section width is the section width of a tire mounted on a rim and inflated; the section width being the distance between the two axially outermost points of the tire mounted on the rim and inflated.

Thus, the radially upper end 12a of the turnup 12 can be disposed on the surface of the sidewall between a point C and a point D.

According to the depiction in FIG. 1, the three adjacent parts 9, 10 and 11 of the turnup of the carcass ply 2 are folded on themselves such that the central part 10 is adjacent to the lateral parts 9 and 11. A decoupling elastomer composition 14 is disposed between the lateral part 11 and the wall of the sidewall 2. This 14 is present as far as a point F, situated on the sidewall, and at a distance equal to 17 mm from the upper part 12a of said turnup 12 towards the inner part of the radial direction. This composition 14 may also be present along a length equal to 60 mm from the upper part 12a of the turnup towards the upper part of the radial direction. This composition 14 may be extended as far as a position axially inside the point S.

The presence of such an elastomer composition makes it possible to precisely adjust the behaviour and endurance of the tire.

In this particular embodiment, the reinforcers (not shown) of the carcass ply 2 are set at an angle equal to 75° with respect to the circumferential direction, between the points C and D, thereby making it possible to maintain a correct cornering thrust.

These same reinforcers are set at an angle equal to 85° with respect to the circumferential direction between the points D and S, thereby making it possible to maintain good rolling resistance, and at an angle equal to 90° with respect to the circumferential direction in the region radially inside the crown reinforcement 3.

Figure 3:
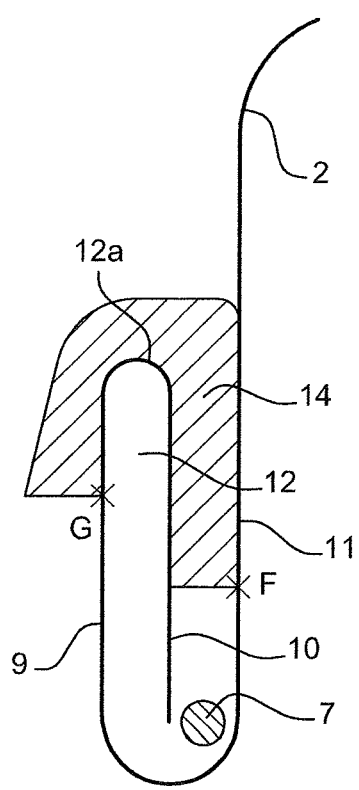
FIG. 3 schematically shows an enlarged view in cross section of the radially lower part of a turnup of the carcass ply, situated in what is known as the bottom region of the tire, according to another embodiment.

In FIG. 3, it is possible to see that the end 8 of the carcass ply 2 is also folded twice in the direction identical to that in FIG. 1. The depiction of this embodiment differs from that in FIG. 1 in that the decoupling composition 14 is also present outside the axially outermost part 9 of the turnup 12 as far as a point G situated on the carcass ply radially inside the end 12*a*, and at a distance, by a length equal to 17 mm, from said upper part 12*a* of the turnup 12 towards the inner part in the radial direction.

According to the invention, the absolute value of the angle of each of the three parts of the carcass ply is identical; only the sign of the angle of the axially outer part 9 changes with respect to the central part 10 and the axially inner part 11.

In the embodiment in FIGS. 2 and 3, the reinforcers (not shown) of the carcass ply 2 are set at angles, with respect to the circumferential direction, that are identical to the embodiment in FIG. 1.

Example 1: Cornering Stiffness

The measurements of cornering stiffness are obtained using a machine equipped with a rolling road and with a device for measuring the transverse forces applied to the tire, depending on the load.

These measurements are carried out on a tire with the reference 205/55 R 16 mounted on a rim 6.5 J 16, inflated to a pressure of 2.5 bar, and subjected to a load of 483 daN. The tire is subjected to a speed of 80 km/h with a cornering angle of +/−1 degree.

The results are set out in Table I below:

|  | Control tire | Tire according to the invention |
| --- | --- | --- |
| Cornering stiffness | 100 | 106 |

As the table shows, the tire according to the invention improves the cornering stiffness by 6%.

Example 2: Mass of the Tire

A measurement of the mass of the tire according to the invention compared with a control tire, for a reference 205/55 R 16, shows a reduction in the overall mass of the tire of 3%.

The invention claimed is:

1. A tire having at least one carcass reinforcement comprising reinforcers, surmounted radially on the outside by a crown reinforcement, itself radially on the inside of a tread, said crown reinforcement being made up of at least one layer of reinforcement elements, said tread being connected to two beads by way of two sidewalls, said beads being adapted to come into contact with a rim flange having a rim flange top C, each bead having at least one circumferential reinforcement element, said carcass reinforcement comprising an end at each bead, the end of the carcass reinforcement being turned up once in an outward radial direction of the tire and about said bead wire, so as to form a turnup, then being folded in said radially inward direction so as to form a fold of the carcass ply and then extending toward an axis of the tire, said fold forming a radially external end and three adjacent parts along an axial direction of the tire made up of a central part, of an axially internal lateral part, and of an axially external lateral part, the fold being executed in an inward axial direction with respect to the centre of the tire, the carcass reinforcement having a final end terminating point of the carcass reinforcement located at an end of an inwardly radially extending portion of the carcass reinforcement, wherein a decoupling elastomer composition having a secant modulus at 10% extension of greater than or equal to 10 MPa and less than or equal to 60 MPa is present between the axially internal lateral part and the central part of said turnup, and at the radially external end of said turnup, said decoupling elastomer composition being present along a radial length comprised between the radially external end of the turnup and a radially internal point F with respect to the end of said turnup, said point being situated on the sidewall and at a distance from said radially external end by a length greater than 10 mm, and wherein the radially external end of the turnup is disposed between the rim flange top C and a point D, said points C and D being situated at the surface of the sidewall and disposed on either side of a point E situated on the sidewall corresponding to the nominal section width, said point D being disposed at a maximum radial length equal to 85% of the length present between the axial end S of the crown reinforcement and the rim flange top C.

2. The tire according to claim 1, wherein the reinforcers of the carcass ply are set at an angle of less than or equal to 85° with respect to the circumferential direction between the points C and D.

3. The tire according to claim 2, wherein the reinforcers of the carcass ply are set at an angle equal to +75° or −75° with respect to the circumferential direction between the points C and D.

4. The tire according to claim 2, wherein the reinforcers of the carcass ply are set at an angle successively equal to −75°, +75°, +75° starting from the most outward direction to the most inward direction in the axial direction between the points C and D.

5. The tire according to claim 1, wherein the reinforcers of the carcass ply are set at an angle of greater than or equal to 85°, with respect to the circumferential direction between the points D and S.

6. The tire according to claim 1, wherein, starting from the point S and in the direction of the axis ZZ′, the reinforcers of the carcass ply are set at an angle equal to 90° with respect to the circumferential direction.

7. The tire according to claim 1, wherein the reinforcers of the carcass ply are made of a textile material chosen from rayon, nylon, polyester, aramid or a mixture thereof.

8. The tire according to claim 1, wherein between 3% and 8% of the reinforcers of the central part are cut.

9. The tire according to claim 8, wherein the cut reinforcers of the central part are consecutive.

10. The tire according to claim 1, wherein the decoupling elastomer composition has secant modulus at 10% extension of greater than or equal to 30 MPa and less than or equal to 60 MPa.

11. The tire according to claim 1, wherein the reinforcers of the carcass ply are set at an angle equal to 90° with respect to the circumferential direction between the points D and S.

12. A tire having at least one carcass reinforcement comprising reinforcers, surmounted radially on the outside by a crown reinforcement, itself radially on the inside of a tread, said crown reinforcement being made up of at least one layer of reinforcement elements, said tread being connected to two beads by way of two sidewalls, said beads being adapted to come into contact with a rim flange having a rim flange top C, each bead having at least one circumferential reinforcement element, said carcass reinforcement comprising an end at each bead, the end of the carcass reinforcement being turned up once in an outward radial direction of the tire and about said bead wire, so as to form a turnup, then being folded in said radially inward direction so as to form a fold of the carcass ply and then extending toward an axis of the tire, said fold forming a radially external end and three adjacent parts along an axial direction of the tire made up of a central part, of an axially internal lateral part, and of an axially external lateral part, the fold being executed in an inward axial direction with respect to the centre of the tire, wherein a decoupling elastomer composition having a secant modulus at 10% extension of greater than or equal to 10 MPa and less than or equal to 60 MPa is present between the axially internal lateral part and the central part of said turnup, and at the radially external end of said turnup, said decoupling elastomer composition being present along a radial length comprised between the radially external end of the turnup and a radially internal point F with respect to the end of said turnup, said point being situated on the sidewall and at a distance from said radially external end by a length greater than 10 mm, wherein the radially external end of the turnup is disposed between the rim flange top C and a point D, said points C and D being situated at the surface of the sidewall and disposed on either side of a point E situated on the sidewall corresponding to the nominal section width, said point D being disposed at a maximum radial length equal to 85% of the length present between the axial end S of the crown reinforcement and the rim flange top C, and wherein the decoupling elastomer composition is present between the radially external end of said turnup and a point G situated radially on the inside with respect to said end and at a distance from said radially external end by a length less than or equal to 10 mm.

\* \* \* \* \*